US011889350B2

(12) United States Patent
Shi

(10) Patent No.: US 11,889,350 B2
(45) Date of Patent: Jan. 30, 2024

(54) CONFIGURING ACTIVATION SIGNALING FOR PCDP DUPLICATION AND BEARER ACTIVATION

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 302 days.

(21) Appl. No.: 17/376,116

(22) Filed: Jul. 14, 2021

(65) Prior Publication Data

US 2021/0345175 A1 Nov. 4, 2021

Related U.S. Application Data

(63) Continuation of application No. PCT/CN2019/072055, filed on Jan. 16, 2019.

(51) Int. Cl.
*H04W 28/06* (2009.01)
*H04L 1/1607* (2023.01)
*H04W 28/04* (2009.01)
*H04W 80/02* (2009.01)

(52) U.S. Cl.
CPC .......... *H04W 28/06* (2013.01); *H04L 1/1614* (2013.01); *H04W 28/04* (2013.01); *H04W 80/02* (2013.01)

(58) Field of Classification Search
CPC ..... H04W 28/06; H04W 28/04; H04W 80/02; H04W 80/08; H04L 1/1614; H04L 1/1848; H04L 1/08; H04L 5/001; H04L 69/40
See application file for complete search history.

(56) References Cited

U.S. PATENT DOCUMENTS

2018/0132220 A1  5/2018  Jang et al.
2020/0145146 A1* 5/2020  Decarreau ............ H04W 28/06
2020/0367091 A1* 11/2020 Xu ..................... H04W 28/0263
(Continued)

FOREIGN PATENT DOCUMENTS

CN   104821859    8/2015
CN   108370304    8/2018
(Continued)

OTHER PUBLICATIONS

U.S. Appl. No. 62/470,402 (Year: 2017).*
(Continued)

*Primary Examiner* — Rushil P. Sampat
(74) *Attorney, Agent, or Firm* — JCIP GLOBAL INC.

(57) ABSTRACT

A data transmission method and a communication device are provided. The method includes: determining, by a packet data convergence protocol (PDCP) entity, the number of copies of duplicated PDCP protocol data unit (PDU); determining, by the PDCP entity, a first radio link layer control protocol (RLC) entity transmitting the PDCP PDU according to indication information; and transmitting, by the PDCP entity, the PDCP PDU to the first RLC entity. According to the data transmission method and the communication device of the embodiments of the disclosure, data duplication and transmission at a PDCP layer may be implemented.

12 Claims, 7 Drawing Sheets

(56) References Cited

U.S. PATENT DOCUMENTS

| | | | | |
|---|---|---|---|---|
| 2021/0105844 A1* | 4/2021 | Joseph | ................ | H04W 80/02 |
| 2021/0112610 A1* | 4/2021 | Xiao | ..................... | H04L 1/1614 |

FOREIGN PATENT DOCUMENTS

| | | |
|---|---|---|
| CN | 108401484 | 8/2018 |
| CN | 108401505 | 8/2018 |

OTHER PUBLICATIONS

WO 2019029683 A1 (Year: 2018).*

WO 2018171546 A1 (Year: 2018).*

"Office Action of Europe counterpart application No. 19910254.2", dated Aug. 1, 2022, pp. 1-4.

Office Action of China Counterpart Application, Application no. 202111227100.4, with English translation thereof, dated Nov. 29, 2022, pp. 1-10.

"Extended European Search Report" of European counterpart application, dated Dec. 14, 2021, pp. 1-8.

Huawei et al., "General enhancements for PDCP Duplication", 3GPP Draft, R2-1817512, TSG-RAN WG2#104, Spokane, USA, Nov. 12, 2018, pp. 1-3.

Oppo, "Discussion on data duplication for IIoT", 3GPP Draft, R2-1817251, TSG-RAN WG2 #104, Spokane, USA, Nov. 12, 2018, pp. 1-2.

Spreadtrum Communications, "Enhancements for PDCP duplication" 3GPP TSG-RAN WG2 Meeting #104 R2-1817324, Nov. 12-16, 2018, pp. 1-2.

Ericsson, "Resource efficient data duplication" 3GPP TSG-RAN WG2 #103bis Tdoc R2-1814814, Oct. 8-12, 2018, pp. 1-2.

3GPP, "Technical Specification; 3rd Generation Partnership Project; Technical Specification Group Radio Access Network; NR; Medium Access Control (MAC) protocol specification (Release 15)", 3GPP TS 38.321 V15.8.0, Dec. 2019, pp. 1-78.

"International Search Report (Form PCT/ISA/210) of PCT/CN2019/072055", dated Sep. 27, 2019, with English translation thereof, pp. 1-6.

"Written Opinion of the International Searching Authority (Form PCT/ISA/237) of PCT/CN2019/072055", dated Sep. 27, 2019, with English translation thereof, pp. 1-6.

\* cited by examiner

| R | R | D/A | DRB identity | | | | |
|---|---|---|---|---|---|---|---|
| D7 | D6 | D5 | D4 | D3 | D2 | D1 | D0 |

| R | Index | DRB identity |
|---|---|---|

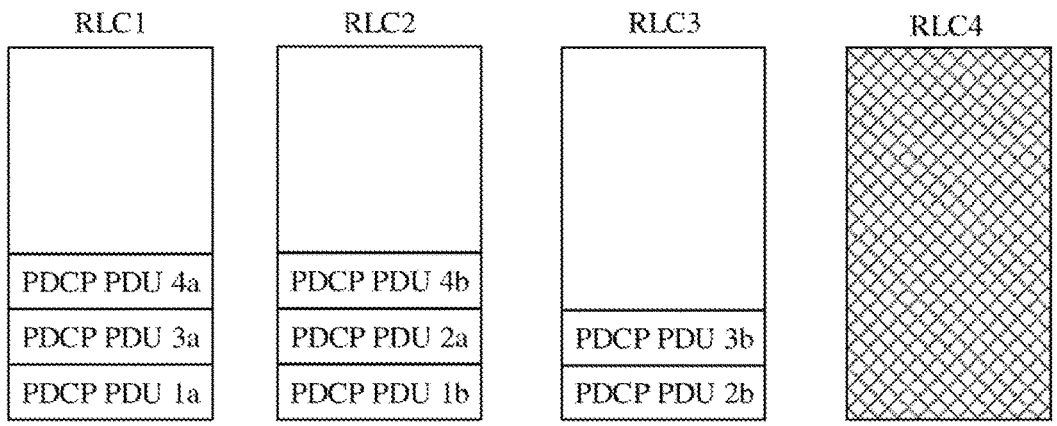
FIG. 10
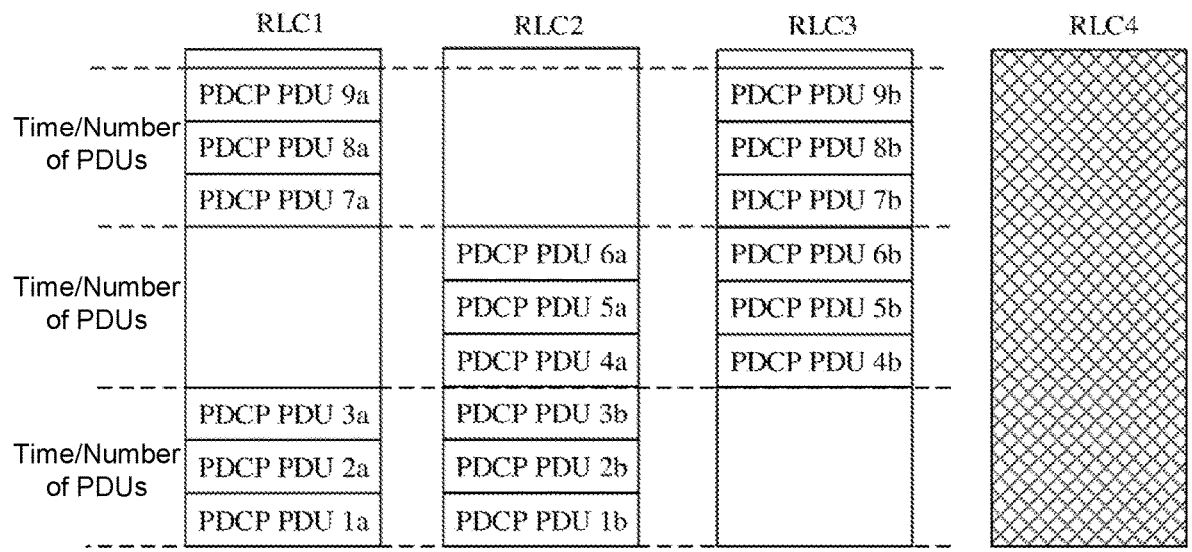
FIG. 11
1200
A PDCP entity transmits a second number of duplicated PDCP PDU to a first number of first RLC entity, wherein the first number is less than the second number — 1210
FIG. 12

CONFIGURING ACTIVATION SIGNALING FOR PCDP DUPLICATION AND BEARER ACTIVATION

CROSS-REFERENCE TO RELATED APPLICATION

This application is a continuation of international PCT application serial no. PCT/CN2019/072055, filed on Jan. 16, 2019. The entirety of the above-mentioned patent application is hereby incorporated by reference herein and made a part of this specification.

BACKGROUND

Technical Field

The disclosure relates to the field of communications, and in particular to a data transmission method and a communication device.

Description of Related Art

The new radio (NR) system puts forward higher requirements for reliability, and data duplication and transmission technology may provide highly reliable transmission. For the data duplication and transmission technology, a sending end sends data packets through multiple links, so a receiving end can receive the data packets correctly with high probability, thereby improving reliability.

Currently, data duplication technology at the packet data convergence protocol (PDCP) layer is supported. The sending end completes the duplication of data at the PDCP layer, and the receiving end completes the removal and discarding of the data duplication when receiving multiple data packets at the PDCP layer.

Therefore, how to implement data duplication and transmission at the PDCP layer is an urgent issue to be solved.

SUMMARY

The embodiments of the disclosure provide a data transmission method and a communication device, which can implement data duplication and transmission at the packet data convergence protocol (PDCP) layer.

In a first aspect, a data transmission method is provided, which comprises the following steps. A PDCP entity determines a number of copies of duplicated PDCP protocol data unit (PDU).

The PDCP entity determines a first radio link layer control protocol (RLC) entity transmitting the PDCP PDU according to indication information.

The PDCP entity transmits the PDCP PDU to the first RLC entity.

In a second aspect, a data transmission method is provided, which comprises the following step. A packet data convergence protocol PDCP entity transmits a second number of duplicated PDCP PDU to a first number of first RLC entity. The first number is less than the second number.

In a third aspect, a terminal communication device is provided, which is used to execute the method in the first aspect or each implementation manner thereof.

Specifically, the communication device comprises a functional module for executing the method in the first aspect or each implementation manner thereof.

In a fourth aspect, a communication device is provided, which is used to execute the method in the second aspect or each implementation manner thereof.

Specifically, the communication device comprises a functional module for executing the method in the second aspect or each implementation manner thereof.

In a fifth aspect, a communication device is provided, which comprises a processor and a memory. The memory is used to store a computer program. The processor is used to call and run the computer program stored in the memory and execute the method in the first aspect or each implementation manner thereof.

In a sixth aspect, a communication device is provided, which comprises a processor and a memory. The memory is used to store a computer program. The processor is used to call and run the computer program stored in the memory and execute the method in the second aspect or each implementation manner thereof.

In a seventh aspect, a chip is provided, which is used to implement the method in any one of the first aspect and the second aspect or each implementation manner thereof.

Specifically, the chip comprises a processor, which is used to call and run the computer program from the memory, so that a device installed with the chip executes the method in any one of the first aspect and the second aspect or each implementation manner thereof.

In an eighth aspect, a computer-readable storage medium is provided for storing a computer program. The computer program enables a computer to execute the method in any one of the first aspect and the second aspect or each implementation manner thereof.

In a ninth aspect, a computer program product is provided, which comprises a computer program command. The computer program command enables a computer to execute the method in any one of the first aspect and the second aspect or each implementation manner thereof.

In a tenth aspect, a computer program is provided, which when running on a computer, enables the computer to execute the method in any one of the first aspect and the second aspect or each implementation manner thereof.

In the above technical solution, the PDCP may determine the first RLC entity transmitting the PDCP PDU according to the indication information after determining the number of copies of the duplicated PDCP PDU, and then transmit the determined PDCP PDU to the first RLC entity, thereby implementing the data duplication and transmission at the PDCP layer.

BRIEF DESCRIPTION OF THE DRAWINGS

FIG. 10 is a schematic diagram of a PDCP entity selecting a first RLC entity according to an embodiment of the disclosure.

FIG. 11 is a schematic diagram of another PDCP selecting a first RLC entity according to an embodiment of the disclosure.

FIG. 12 is a schematic flowchart of another data transmission method according to an embodiment of the disclosure.

DETAILED DESCRIPTION OF DISCLOSED EMBODIMENTS

The technical solution in the embodiments of the disclosure will be described below in conjunction with the drawings in the embodiments of the disclosure. Obviously, the described embodiments are some but not all of embodiments of the disclosure. Based on the embodiments in the disclosure, all other embodiments obtained by persons skilled in the art without creative effort shall fall within the protection scope of the disclosure.

The embodiments of the disclosure may be applied to various communication systems, such as a global system of mobile communication (GSM) system, a code division multiple access (CDMA) system, a wideband code division multiple access (WCDMA) system, a general packet radio service (GPRS), a long term evolution (LTE) system, an advanced long term evolution (LTE-A) system, a new radio (NR) system, an evolution system of the NR system, an LTE-based access to unlicensed spectrum (LTE-U) system on unlicensed spectrum, an NR-based access to unlicensed spectrum (NR-U) system on unlicensed spectrum, a universal mobile telecommunication system (UMTS), a wireless local area networks (WLAN), a wireless fidelity (WiFi), a next-generation communication system, or other communication systems.

Generally speaking, traditional communication systems support a limited number of connections and are easy to implement. However, with the development of communication technology, mobile communication systems not only support traditional communication, but also support, for example, device to device (D2D) communication, machine to machine (M2M) communication, machine type communication (MTC), and vehicle to vehicle (V2V) communication, etc. The embodiments of the disclosure may also be applied to the communication systems.

Optionally, the communication system in the embodiments of the disclosure may be applied to a carrier aggregation (CA) scenario, a dual connectivity (DC) scenario, or a standalone (SA) network scenario.

The embodiments of the disclosure do not limit the applied spectrum. For example, the embodiments of the disclosure may be applied to licensed spectrum or unlicensed spectrum.

Figure 1:
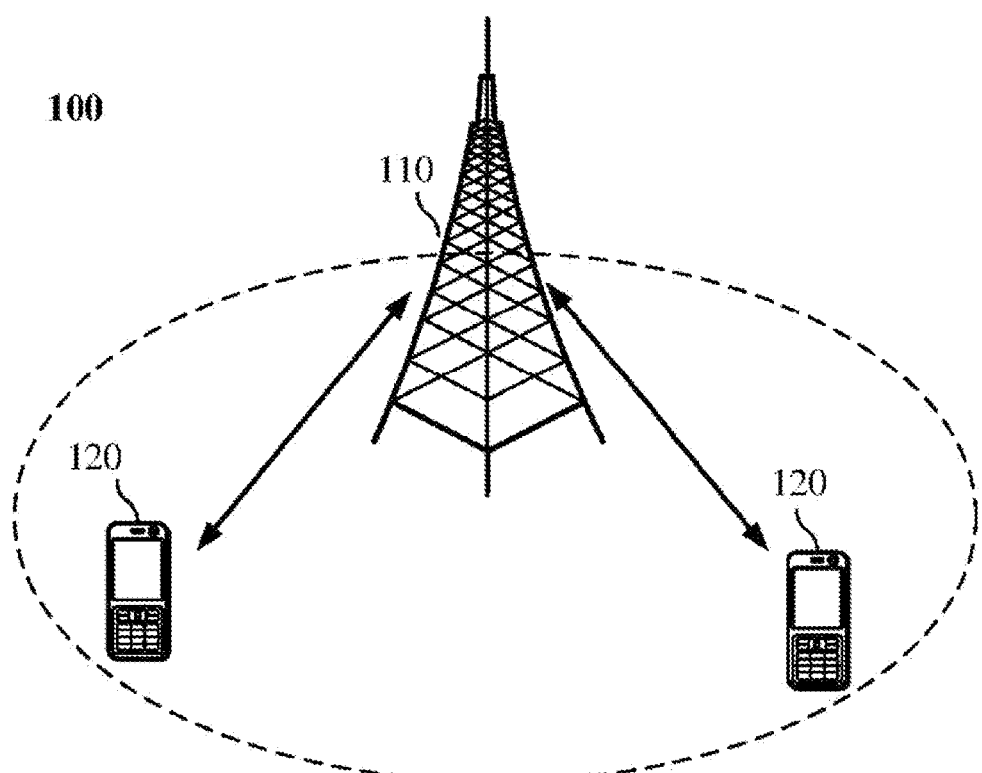
FIG. 1 is a schematic diagram of a communication system architecture according to an embodiment of the disclosure.

Exemplarily, a communication system 100 applied in the embodiment of the disclosure is shown in FIG. 1. The communication system 100 may include a network device 110. The network device 110 may be a device that communicates with a terminal device 120 (also referred to as a communication terminal or a terminal). The network device 110 may provide communication coverage for a specific geographic area and may communicate with a terminal device located in the coverage area. Optionally, the network device 110 may be a base transceiver station (BTS) in the GSM system or the CDMA system, a Node B (NB) in the WCDMA system, an evolved Node B (eNB or eNodeB) in the LTE system, or a wireless controller in a cloud radio access network (CRAN). Alternatively, the network device may be a mobile switching center, a relay station, an access point, an on-board device, a wearable device, a hub, a switch, a bridge, a router, a network-side device in 5G networks, a network device in the future evolution of a public land mobile network (PLMN), etc.

The communication system 100 further comprises at least one terminal device 120 located in the coverage range of the network device 110. As used herein, the "terminal device" includes, but is not limited to, connection via wired lines, such as via a public switched telephone network (PSTN), a digital subscriber line (DSL), a digital cable, a direct cable connection; another data connection/network; a wireless interfaces, such as a cellular network, a wireless local area network (WLAN), a digital television network such as a DVB-H network, a satellite network, an AM-FM broadcast transmitters; another terminal device set to receive/send communication signals; and/or an Internet of Things (IoT) device. The terminal device set to communicate through the wireless interface may be referred to as a "wireless communication terminal", a "wireless terminal", or a "mobile terminal". Examples of the mobile terminal include, but are not limited to, a satellite or a cellular phone; a personal communications system (PCS) terminal that may combine a cellular wireless phone with data processing, a fax, and data communication capabilities; a personal digital assistant (PDA) that may include a wireless phone, a pager, an Internet/Intranet access, a Web browser, a notebook, a calendar, and/or a global positioning system (GPS) receiver; a conventional laptop and/or palmtop receiver; or other electronic devices including a wireless phone transceiver. The terminal device may refer to an access terminal, a user equipment (UE), a user unit, a user station, a mobile station, a remote station, a remote terminal, a mobile equipment, a user terminal, a terminal, a wireless communication device, a user agent, or a user device. The access terminal may be a cellular phone, a cordless phone, a session initiation protocol (SIP) phone, a wireless local loop (WLL) station, a PDA, a handheld device with wireless communication functional, a computing device, other processing devices connected to a wireless modem, an on-board device, a wearable device, a terminal device in 5G network, a terminal device in the future evolution of the PLMN, etc.

Optionally, D2D communication may be performed between the terminal devices 120.

FIG. 1 exemplarily shows a network device and two terminal devices. Optionally, the communication system 100 may include multiple network devices, and the coverage range of each network device may include other number of terminal devices, which are not limited in the embodiment of the disclosure.

Optionally, the communication system 100 may further include other network entities such as a network controller and a mobility management entity, which are not limited in the embodiment of the disclosure.

It should be understood that a device with communication function in the network/system in the embodiment of the disclosure may be referred to as a communication device. Taking the communication system 100 shown in FIG. 1 as an example, the communication device may include the network device 110 with communication function and the terminal device 120. The network device 110 and the terminal device 120 may be the specific devices described above, which will not be repeated herein. The communication device may further include other devices in the communication system 100, such as other network entities such as a network controller and a mobility management entity, which are not limited in the embodiment of the disclosure.

The NR system supports two duplicate data transmission modes, DC-based duplicate data transmission and CA-based duplication data transmission. The two duplicate data transmission manners are respectively described below.

Figure 2:
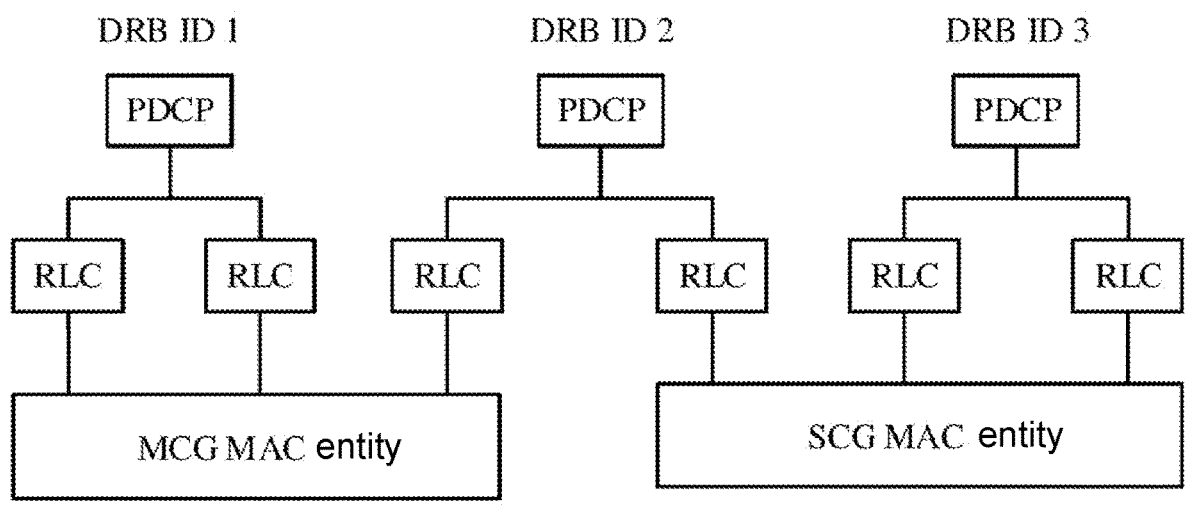
FIG. 2 is a schematic diagram of a duplicate data transmission architecture according to an embodiment of the disclosure.

The protocol architecture of the DC-based duplicate data transmission manner is shown in a data radio bearer (DRB) ID 2 in FIG. 2. The DC-based duplicate data transmission adopts a split bearer protocol architecture. It can be seen that a packet data convergence protocol (PDCP) entity is associated with two different radio link control protocol (RLC) entities. The two different associated RLC entities are associated with different medium access control (MAC) entities. One MAC entity corresponds to a master cell group (MCG) and one MAC entity corresponds to a secondary cell group (SCG). In terms of uplink or downlink, the PDCP entity duplicates a PDCP protocol data unit (PDU) into the same two copies. The two PDCP PDUs pass through different RLC entities and MAC entities, then pass through an air interface to reach the terminal device (downlink) or the MAC entity and the RLC entity corresponding to the network device (uplink), and finally converge to the PDCP. A PDCP layer detects that the two PDCP PDUs are the same duplicate data, discards one of them, and then delivers the other one to a higher layer.

The protocol architecture of the CA-based duplicate data transmission method is shown as a DRB ID 1 or a DRB ID 3 in FIG. 2. The CA-based duplicate data transmission adopts CA protocol architecture. It can be seen that the PDCP entity is associated with two different RLC entities. The two different associated RLC entities are associated with the same MAC entity. In terms of uplink and downlink, the PDCP PDU is duplicated into the same two copies. The two PDCP PDUs pass through different RLC entities, the same MAC entity, then pass through the air interface to reach the terminal device (downlink) or the MAC entity and the RLC entity corresponding to the network device (uplink), and finally converge to the PDCP. The PDCP layer detects that the two PDCP PDUs are the same duplicate version, discards one of them, and then delivers the other one to the higher layer.

In order to meet reliability requirements, the duplicated PDCP PDU may be transmitted on different carriers. For the DC-based duplicate data transmission, since different RLC entities correspond to different MAC entities, the duplicated PDCP PDU may naturally be transmitted on different carriers. For the CA-based duplicate data transmission, different RLC entities correspond to the same MAC entity. Logical channels of the RLC entities may be configured with logical channel prioritization (LCP) restriction, that is, data of the logical channels is restricted to only be transmitted on corresponding carriers. Through such configuration, it may be ensured that duplicate data of different RLC entities may be transmitted on different carriers even when the same MAC entity is passed through, thereby achieving reliability requirements.

In the existing protocol (NR R15), for a DRB configured with duplicate data transmission function, a network device may dynamically activate or deactivate the data duplication and transmission function of a certain DRB through a MAC control element (CE). The MAC CE contains an 8-bit bitmap. Bits in the bitmap respectively correspond to different DRBs. The difference in values of the bits indicates the activation or deactivation of the data duplication function of the PDCP entity of the corresponding DRB.

For the DC-based duplicate data transmission, when a DRB transitions from an activated state to a deactivated state, the PDCP entity stops replicating data, that is, the PDCP PDU. At the same time, the PDCP entity indicates a secondary RLC entity to discard all duplicated PDCP PDU. The DRB returns to the operation of split bearer. For the CA-based duplicate data transmission, when a DRB transitions from the activated state to the deactivated state, the PDCP entity stops replicating data, that is, the PDCP PDU. The PDCP entity indicates the secondary RLC entity to discard all duplicated PDCP PDU. At the same time, the PDCP entity only delivers non-duplicated PDCP PDU to a master RLC entity.

The existing duplicate data transmission can only support the association of the PDCP entity with a maximum of 2 RLC entities while the number of copies of the duplicate data is a maximum of 2 copies. That is, one RLC entity transmits one copy of the duplicated PDCP PDU, cannot support more copies of the PDCP PDU, and cannot support a greater number of the associated RLC entity. Moreover, in such cases, the behavior of the PDCP layer delivering duplicate data is also not clearly defined.

In view of this, the embodiment of the disclosure provides a data transmission method, which can implement data duplication and transmission at a PDCP layer.

Figure 3:
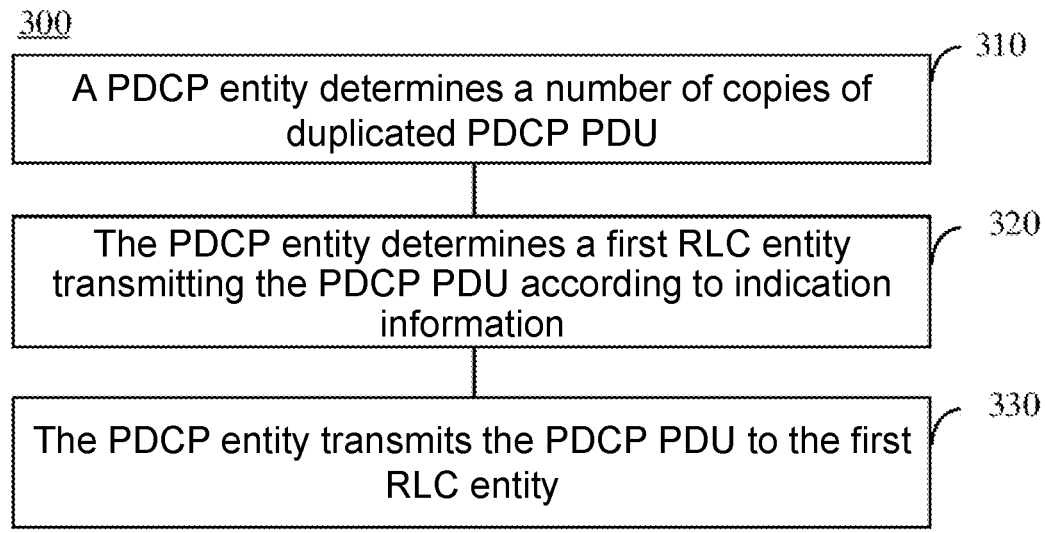
FIG. 3 is a schematic flowchart of a data transmission method according to an embodiment of the disclosure.

FIG. 3 is a schematic flowchart of a data transmission method 300 according to an embodiment of the disclosure. The method 300 may be executed by a data sending end. The data sending end may be a communication device. For example, the method 300 may be executed by a network device or a terminal device.

Optionally, when the method 300 is used for uplink transmission, the data sending end is the terminal device and the data receiving end is the network device.

Optionally, when the method 300 is used for downlink transmission, the data sending end is the network device and the data receiving end is the terminal device.

Of course, the method 300 may also be used for D2D transmission or V2V transmission.

The method 300 may include at least some of the following content.

In 310, a PDCP entity determines the number of copies of the duplicated PDCP PDU.

In 320, the PDCP entity determines a first RLC entity transmitting the PDCP PDU according to indication information.

In 330, the PDCP entity transmits the PDCP PDU to the first RLC entity.

Optionally, in the embodiment of the disclosure, the number of copies of the duplicated PDCP PDU may be greater than 2. The RLC entity associated with the PDCP entity may also be greater than 2. In this way, the reliability of the system may be improved.

The PDCP entity may determine the number of copies of the duplicated PDCP PDU in the following manners:

Manner 1: The PDCP entity receives configuration information. The configuration information is used to indicate the number of copies of the duplicated PDCP PDU.

During uplink transmission, the network device may send the configuration information to the terminal device. After the PDCP entity of the terminal device receives the configuration information indicating the number of copies of the PDCP PDU, the PDCP entity may determine the number of copies of the duplicated PDCP PDU.

Manner 2: The number of copies of the duplicated PDCP PDU is configured in the PDCP entity.

For example, the number of copies of the PDCP PDU may be configured in the PDCP entity based on a protocol or pre-configured to the PDCP entity by the network device. For example, the preset number of copies of the duplicated PDCP PDU is 2 or 4.

Manner 3: The PDCP entity may determine the number of copies of the duplicated PDCP PDU based on the RLC entities for transmitting duplicate data.

Exemplarily, if the number of the RLC entities for transmitting the duplicate data is N, the PDCP entity may duplicate the PDCP PDU into N copies, where N is a positive integer greater than or equal to 2.

Figure 4:
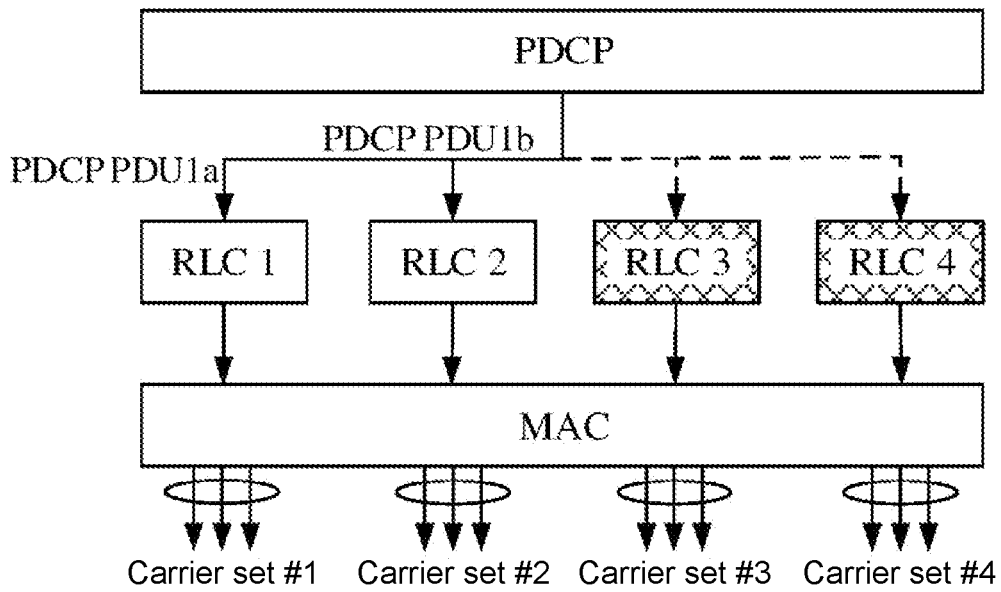
FIG. 4 is a schematic diagram of a number of copies of a packet data convergence protocol (PDCP) protocol data unit (PDU) being equal to a number of a radio link layer control protocol (RLC) entity for transmitting duplicate data according to an embodiment of the disclosure.

Referring to FIG. 4, the network device configures 4 RLC entities, which are respectively RLC1, RLC2, RLC3, and RLC4, for the PDCP entity of a certain DRB, where RLC1 and RLC2 are used to transmit duplicate data. When the PDCP entity delivers data to the RLC entity, the PDCP PDU may be duplicated into 2 copies, which are respectively PDCP PDU 1*a* and PDCP PDU 1*b*.

Optionally, the number of copies of the duplicated PDCP PDU may be less than the number of the RLC entities for transmitting the duplicate data.

Figure 5:
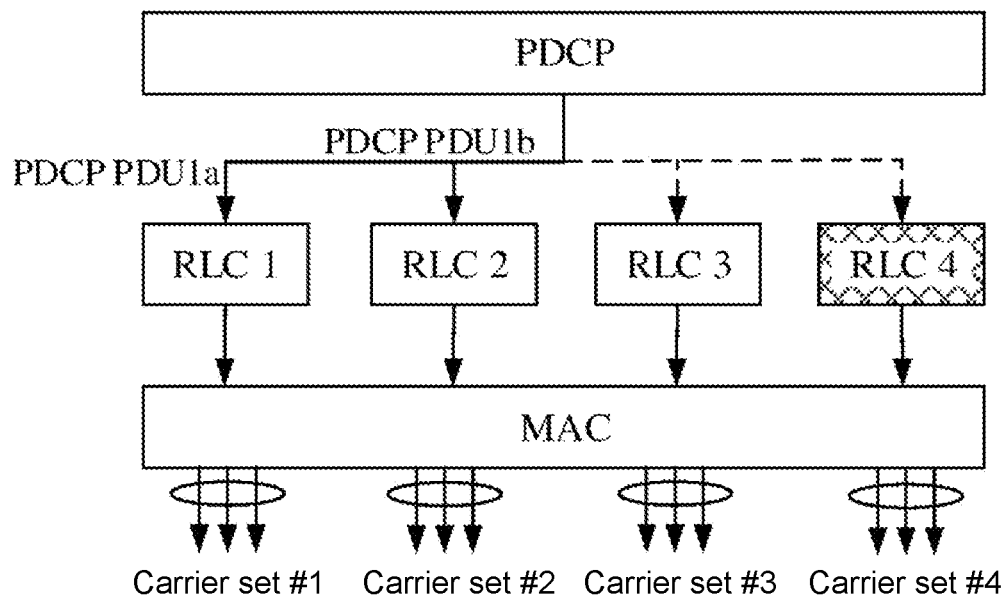
FIG. 5 is a schematic diagram of a number of copies of a PDCP PDU being less than a number of RLC entities for transmitting duplicate data according to an embodiment of the disclosure.

Referring to FIG. 5, the network device configures 4 RLC entities, which are respectively RLC1, RLC2, RLC3, and RLC4, for the PDCP entity of a certain DRB, where RLC1, RLC2, and RLC3 are used to transmit duplicate data. The PDCP entity duplicates the PDCP PDU into 2 copies, which are respectively PDCP PDU 1*a* and PDCP PDU 1*b*. It can be seen that at this time, the number of copies of the PDCP PDU is less than the number of the RLC entities for transmitting the duplicate data.

Optionally, the number of copies of the duplicated PDCP PDU may be greater than the number of the RLC entities for transmitting the duplicate data.

Figure 6:
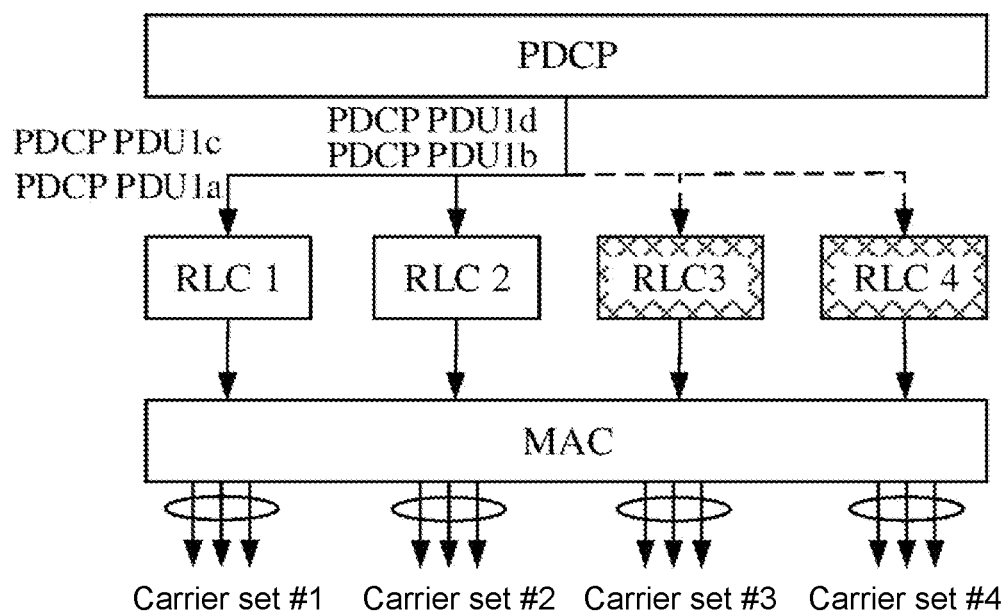
FIG. 6 is a schematic diagram of a number of copies of a PDCP PDU being greater than a number of RLC entities for transmitting duplicate data according to an embodiment of the disclosure.

Referring to FIG. 6, the network device configures 4 RLC entities, which are respectively RLC1, RLC2, RLC3, and RLC4, for the PDCP entity of a certain DRB, where RLC1 and RLC2 are used to transmit duplicate data. The PDCP entity duplicates the PDCP PDU into 4 copies, which are respectively PDCP PDU 1*a*, PDCP PDU 1*b*, PDCP PDU 1*c*, and PDCP PDU 1*d*. It can be seen that at this time, the number of copies of the PDCP PDU is greater than the number of the RLC entities for transmitting the duplicate data.

Optionally, in the embodiment of the disclosure, if the data sending end is the terminal device, the method 300 may further include the following step. The PDCP entity receives an activation signaling. The activation signaling is used to activate the data duplication function of the PDCP entity.

The activation signaling may be a first radio resource control (RRC) signaling or the MAC CE.

If the activation signaling is the MAC CE, the MAC entity of the terminal device may indicate a PDCP duplication activation to the PDCP layer of the corresponding DRB. The DRB is configured with the data duplication and transmission of the PDCP entity.

If the activation signaling is the first RRC signaling, an RRC may control the activation of the data duplication function of the corresponding signaling radio bearer (SRB) or the PDCP entity of the DRB.

Figures 7, 8, 9:
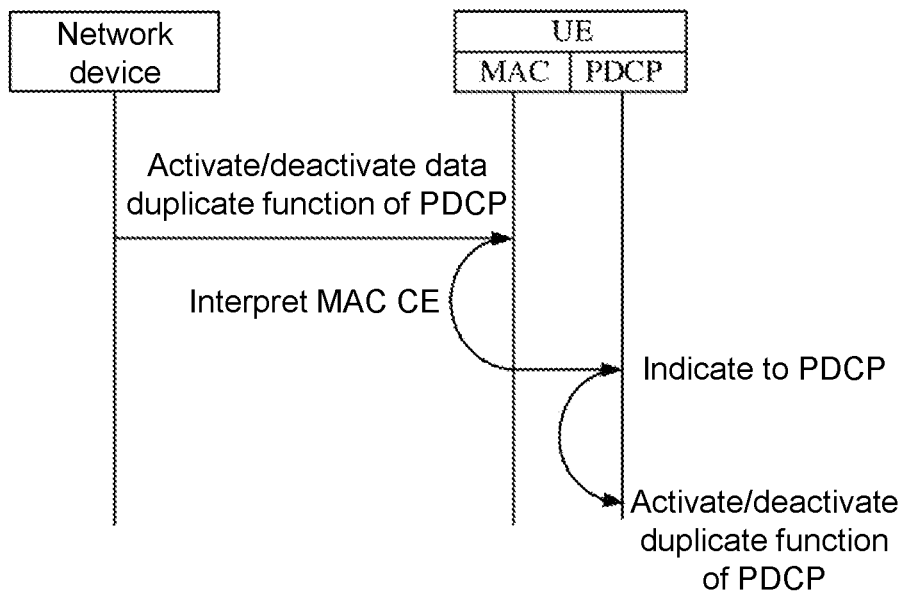
FIG. 7 is a schematic flowchart of activation/deactivation according to an embodiment of the disclosure.
FIG. 8 is a schematic diagram of a MAC control element (CE) format according to an embodiment of the disclosure.
FIG. 9 is a schematic diagram of another MAC CE format according to an embodiment of the disclosure.

For example, as shown in FIG. 7, if the network device intends to activate the PDCP data duplication function of a certain or several configured DRBs, the network device may send the MAC CE to the terminal device. After the MAC layer of the terminal device receives the MAC CE, the MAC CE may be interpreted. That is, the bits in the bitmap are corresponded to the corresponding DRB according to rules, and the activation of the PDCP data duplication function of the DRB is indicated to the PDCP layer, so that the PDCP layer may perform corresponding processing on the PDCP PDU according to the indication of the MAC layer.

Optionally, in the embodiment of the disclosure, the PDCP entity may also obtain the RLC entities for transmitting the duplicate data.

As an example, the activation signaling may include the RLC entities for transmitting the duplicate data.

For example, the PDCP entity may receive the MAC CE for activating the data duplication function of the PDCP entity sent by the network side. The MAC CE is not only used to indicate the activation of the data duplication function of the PDCP entity, but also may include the RLC entities for transmitting the duplicate data. A possible format of the MAC CE is shown in FIG. 8, where a DRB identity corresponds to the ID of the DRB that activates the duplicate data transmission, and the bitmap corresponds to all RLC entities associated with the PDCP entity of the DRB.

In FIG. 8, the MAC CE format is 1 byte. Since the current number of the DRB is 32, 5 bits are adopted to indicate different DRB IDs. One bit indicates whether the duplicate data transmission function of the DRB is activated, such as D/A, the remaining two bits are reserved bits. D7D6 . . . D0 is used to indicate the RLC entity. For example, the DRB of a DRB ID 8 is associated with 4 RLC entities, 4 bits in D7D6 . . . D0 are valid, which may be the last 4 or the first 4. The embodiment of the disclosure takes the last 4 bits as an example for description. If D3D2D1D0=1100, then 2 of the 4 RLC entities are used to transmit the duplicate data, and the other two do not transmit the duplicate data.

The correspondence between D3D2D1D0 and RLC may be in ascending or descending order of a logical channel identity (LCID). The correspondence between RLC and LCID may be preset on the PDCP entity. For example, the correspondence may be pre-configured to the PDCP entity by the network device. For example, the LCIDs of the 4 RLC entities associated with the DRB of the DRB ID 8 are respectively 1, 4, 5, and 8. The RLC entities with the LCIDs 1, 4, 5, and 8 may be corresponded to the bits in ascending order.

It should be understood that the specific examples in the embodiments of the disclosure are only to assist persons skilled in the art to better understand the embodiments of the disclosure and are not intended to limit the scope of the embodiments of the disclosure.

As another example, if the activation signaling is the MAC CE, the method may further include the following step. The PDCP entity receives a second RRC signaling. The second RRC signaling comprises the RLC entities for transmitting the duplicate data.

For example, the network device may send the second RRC signaling to the terminal device. The second RRC signaling configures the RLC entities for transmitting the duplicate data after a certain DRB receives the MAC CE that is activated for duplication and transmission.

As another example, the second RRC signaling may configure a combination of some RLC entities. The MAC CE indicates the combination of RLC entities to be used to transmit the duplicate data after the duplicate data transmission function of the PDCP entity is activated. FIG. 9 shows a format of the MAC CE indicating the combination of RLC entities and a format of configuring signaling. In such case, the number of combinations of RLC entities that may be indicated by the MAC CE may be determined by the number of bits occupied by an index. For example, in the example, the index occupies 2 bits, so a maximum of 4 combinations is indicated.

In other words, the network device may pre-configure up to 4 combinations of RLC entities for the DRB. The terminal device uses the index in the MAC CE to select the specific combination of RLC entities for transmitting the duplicate data after the DRB is activated.

It should be understood that the size of the index may be changed. For example, if the index occupies 1 bit, then only two configurations of combinations of RLC entities can be indicated.

It should be understood that in the embodiments of the disclosure, "first" and "second" are only used to distinguish different objects, but do not limit the scope of the embodiments of the disclosure.

When the PDCP entity delivers the PDCP PDU to the RLC entity, the PDCP entity may determine the delivery manner of the PDCP PDU according to the number of the associated RLC entity and/or whether the data duplication function of the PDCP entity is activated.

If the PDCP entity is only associated with one RLC entity, the PDCP entity may directly deliver the PDCP PDU to the RLC entity (that is, the PDCP PDU is not duplicated).

If the PDCP entity is associated with more than or equal to 2 RLC entities, the PDCP entity may further judge whether the data duplication function of the PDCP entity is activated. If the data duplication function of the PDCP entity is activated, the PDCP entity may determine the delivery manner of the duplicated PDCP PDU.

The three cases where the number of copies of the duplicated PDCP PDU is equal to, less than, or greater than the number of the RLC entities for transmitting the duplicate data are respectively introduced below.

Embodiment 1: The Number of Copies of the Duplicated PDCP PDU is Equal to the Number of the RLC Entities for Transmitting the Duplicate Data After the PDCP entity determines the number of copies of the duplicated PDCP PDU, the PDCP entity may determine the first RLC entity transmitting the duplicated PDCP PDU according to the indication information.

The first RLC entity may belong to some or all RLC entities for transmitting the duplicate data.

Optionally, the indication information may be configured in the PDCP entity, or the indication information may be sent to the PDCP entity by the network device. When the indication information is sent by the network device to the PDCP entity, the indication information may be carried in the MAC CE or downlink control information (DCI).

In an implementation manner, the PDCP entity determining the first RLC entity for transmitting the duplicated PDCP PDU according to the indication information may include the following. The PDCP entity determines the first RLC entity in the RLC entities for transmitting the duplicate data according to the indication information.

As an example, the indication information may be used to indicate that all RLC entities for transmitting the duplicate data are determined as the first RLC entities.

Referring to FIG. 4 again, the RLC entities for transmitting the duplicate data are RLC1 and RLC2, and the number of copies of the duplicated PDCP PDU is also 2. The indication information may indicate that the 2 copies of the duplicated PDCP PDU are delivered to the corresponding RLC entities. That is, the PDCP entity delivers PDCP PDU 1a to RLC1, and PDCP PDU 1b to RLC2, where PDCP PDU 1a and PDCP PDU 1b are the same PDCP PDU.

At this time, the number of copies of the duplicated PDCP PDU is equal to the number of the first RLC entity.

As another example, the indication information may be used to indicate the PDCP entity to randomly select the first RLC entity in the RLC entities for transmitting the duplicate data.

For example, the RLC entities for transmitting the duplicate data are RLC1 and RLC2, and the number of copies of the duplicated PDCP PDU is also 2. The indication information may indicate the PDCP entity to randomly select the first RLC entity from RLC1 and RLC2. The PDCP entity may select RLC1 as the first RLC entity, that is, the PDCP entity delivers both PDCP PDU 1a and PDCP PDU 1b to RLC1, where PDCP PDU 1a and PDCP PDU 1b are the same PDCP PDU.

At this time, the number of copies of the duplicated PDCP PDU is greater than the number of the first RLC entity.

In the above technical solution, the PDCP entity randomly selects the first RLC entity in the RLC entities for transmitting the duplicate data. In this way, the duplicate data of the PDCP PDU may be transmitted on different carriers without an additional signaling indication, which improves the diversity effect of data transmission to a certain extent. In addition, since the PDCP entity performs the detection of duplicate data packets, such random selection manner has no effect on the data receiving end.

As another example, the indication information may be used to indicate the PDCP entity to determine the first RLC entity based on at least one of the number of retransmissions of data corresponding to the RLC entities for transmitting the duplicate data, the number of copies of the PDCP PDU transmitted by the RLC entities for transmitting the duplicate data, and the time for the RLC entities for transmitting the duplicate data to transmit the PDCP PDU.

Exemplarily, the network device may pre-configure a selection mode. For example, after L selected first RLC entity transmits for a certain time or a certain number of the PDCP PDU, another L first RLC entity is selected for duplicate data transmission, where L is a positive integer.

For example, the number of copies of the duplicated PDCP PDU is 3, and the number of the RLC entities for transmitting the duplicate data is also 3, which are respectively RLC1, RLC2, and RLC3. During a first period of time, the PDCP entity may deliver the duplicate data to RLC1 and RLC2. During a second period of time, the PDCP entity may deliver the duplicate data to RLC2 and RLC3.

During a third period of time, the PDCP entity may deliver the duplicate data to RLC1 and RLC3.

Alternatively, after the PDCP entity transmits M duplicate data to RLC1 and RLC3, the PDCP entity switches to RLC2 and RLC3, and transmits the duplicate data to RLC2 and RLC3. After transmitting the M duplicate data to RLC2 and RLC3, the PDCP entity switches to RLC1 and RLC3, and transmits the duplicate data to RLC1 and RLC3, where M is a positive integer.

Illustratively again, if the RLC entity is an RLC acknowledged mode (AM) entity, the PDCP entity may select the first RLC entity based on the number of retransmissions of the RLC PDU of the RLC AM entity.

For example, when the number of retransmissions of the RLC PDU is greater than a certain threshold, it may be considered that either the RLC entity itself has a protocol issue or the channel quality of the carrier associated with the logical channel of the RLC is poor. At this time, the RLC entity may be considered as not suitable for transmitting the duplicate data, so another RLC entity may be selected to transmit the duplicate data.

Illustratively again, the PDCP entity may select the first RLC entity based on the number of retransmissions of the MAC PDU.

For example, MAC PDU is scheduled to be transmitted on a specific physical carrier. If the number of retransmissions of a hybrid automatic repeat request (HARQ) reaches a certain threshold, it is considered that the channel quality of the carrier has deteriorated. The PDCP entity may select another first RLC entity that is not associated with the carrier to transmit the duplicate data.

At this time, the number of the first RLC entity selected by the PDCP entity may be equal to the number of copies of the duplicated PDCP PDU, or the number of the first RLC entity selected by the PDCP entity may be less than the number of copies of the duplicated PDCP PDU.

It should be noted that since the number of copies of the PDCP PDU is greater than the number of the first RLC entity, at least one RLC entity may transmit the same duplicate data. If the duplicate data are multiplexed into the same MAC PDU or are scheduled on the same physical carrier, the reliability of multiple duplicate copies may be reduced. Therefore, it is necessary to ensure that the same duplicate data transmitted in the same RLC entity is transmitted in different MAC PDUs or on different physical carriers.

At this time, if a second RLC entity in the first RLC entity receives multiple PDCP PDUs in the duplicated PDCP PDU, the method 300 may further include the following step. The PDCP entity transmits multiple PDCP PDUs to the second RLC entity based on at least one of the transmission time of the PDCP PDU, the number of data packets, and the size of the data packet.

The PDCP PDUs mentioned in the above content satisfy at least one of the following conditions: the transmission time between every two PDCP PDUs in the PDCP PDUs is greater than or equal to a predetermined time; the number of data packets between every two PDCP PDUs in the PDCP PDUs is greater than or equal to a predetermined number; and the size of the data packet between every two PDCP PDUs in the PDCP PDUs is greater than or equal to a predetermined size.

In other words, the PDCP entity delivers the same duplicate data to the same RLC entity after a corresponding interval of time, intersperses a certain number of other data packets, or intersperses one or more other data packets with a certain size.

Optionally, the predetermined time, the predetermined number, and the predetermined size in the above content may be configured by the network device or may be stipulated by a protocol, which is not specifically limited in the embodiment of the disclosure.

For example, the predetermined time may be T, the predetermined number may be S, and the predetermined size may be X. After the PDCP entity transmits a first duplicated PDCP PDU to the second RLC entity, a second identical PDCP PDU may be transmitted to the second RLC entity after the time T. Alternatively, after the PDCP entity transmits the first duplicated PDCP PDU to the second RLC entity, the second PDCP PDU identical to the first PDCP PDU may be transmitted to the second RLC entity after the time T and the second RLC entity receives S other data packets. Alternatively, after the PDCP entity transmits the first duplicated PDCP PDU to the second RLC entity, the second PDCP PDU identical to the first PDCP PDU may be transmitted to the second RLC entity after the time T, the second RLC entity receives S other data packets, and the size of the other data packet received by the second RLC entity reaches X.

As an example, the interval of time may be a timer. For example, the PDCP entity transmits the duplicated PDCP PDU $1a$ and PDCP PDU $1b$ to the second RLC. After the PDCP entity delivers the PDCP PDU $1a$ to the second RLC entity, a timer is initiated. After the timer expires, the PDCP PDU $1b$ may be delivered.

Optionally, the method 300 may further include the following step. The PDCP entity sends first information to the second RLC entity. The first information is used to indicate that the PDCP PDUs are the same PDCP PDU.

Correspondingly, after receiving the first information, the second RLC entity may mark the same PDCP PDU with the same serial number (SN) and/or send third information to the MAC entity. The third information is used to indicate that the PDCP PDUs are the same PDCP PDU. Therefore, when multiplexing data of different logical channels, the MAC entity may multiplex the same PDCP PDU to different MAC PDUs or transmit the same PDCP PDU from the same RLC entity on different carriers.

When the PDCP entity transmits the PDCP PDU to the first RLC, the PDCP entity may also determine the number of copies of the PDCP PDU transmitted to each RLC entity in the first RLC entity.

If the number of copies of the duplicated PDCP PDU is equal to the number of the first RLC entity, the number of copies of the PDCP PDU transmitted by each RLC entity in the first RLC entity are all 1.

If the number of copies of the duplicated PDCP PDU is greater than the number of the first RLC entity, the reliability of duplicate data transmission may be improved.

As an example, the number of copies of the PDCP PDU transmitted by the PDCP entity to each RLC entity in the first RLC entity may be configured in the PDCP entity, which may be pre-configured to the PDCP entity by the network device or may be stipulated by a protocol.

As another example, the PDCP entity may receive second information. The second information is used to indicate the number of copies of the PDCP PDU transmitted by the PDCP entity to each RLC entity in the first RLC entity.

Optionally, the second information may be carried in the activation signaling, such as the MAC CE. At this time, the MAC CE may indicate the number of copies of the PDCP PDU that may be received by a certain RLC entity in the first RLC entity through carrying an indication field.

When the data sending end is a terminal device, if the number of copies of the PDCP PDU transmitted by the PDCP entity to each RLC entity in the first RLC entity is configured by the network device, in a possible embodiment, the network device may configure the maximum number of copies transmitted by the PDCP entity to each RLC entity in the first RLC entity. The specific number of copies actually transmitted may be determined by the PDCP entity according to actual transmission situation.

Optionally, the PDCP entity may determine the number of copies of the PDCP PDU actually transmitted to each RLC entity in the first RLC entity according to the channel quality of the physical carrier corresponding to the logical channel of each RLC entity in the first RLC entity.

For example, the first RLC entity comprises RLC1 and RLC2. The network device configures that RLC1 and RLC2 may respectively transmit a maximum of 3 copies of the PDCP PDU. When the channel quality of the physical carrier corresponding to the logical channel of RLC1 is better (which may be, for example, judged according to HARQ feedback), the PDCP entity of the terminal device may deliver the 3 copies of the PDCP PDU to RLC1 and 1 copy of the PDCP PDU to RLC2.

Optionally, if the first RLC entity is the RLC AM, the PDCP entity may determine the number of copies of the PDCP PDU actually transmitted to each RLC entity in the first RLC entity according to the number of retransmissions of the RLC PDU.

For example, the first RLC entity comprises RLC1 and RLC2. The network device configures that RLC1 and RLC2 may respectively transmit a maximum of 3 copies of the PDCP PDU. The threshold of the number of retransmissions of the RLC PDU is 4. If the number of retransmissions of the RLC PDU of RLC1 is 5, the PDCP entity may deliver 1 copy of the PDCP PDU to RLC1. If the number of retransmissions of the RLC PDU of RLC2 is 1, the PDCP entity may deliver 3 copies of the PDCP PDU to RLC2.

In the embodiment of the disclosure, the number of copies of the PDCP PDU received by each RLC entity in the first RLC entity may be the same. In other words, the PDCP entity may evenly distribute different duplicate data of the same PDCP PDU to different RLC entities in the first RLC entity.

For example, there are 4 copies of the duplicate data of the same PDCP PDU, which are respectively PDCP PDU 1a, PDCP PDU 1b, PDCP PDU 1c, and PDCP PDU 1d. The PDCP entity may deliver 2 copies of the duplicate data (PDCP PDU 1a and PDCP PDU 1c) to RLC1, and the other two copies of the duplicate data (PDCP PDU 1b and PDCP PDU 1d) to RLC2.

The above technical solution does not require the additional configuration of a signaling or an indication signaling, which only needs to be agreed in advance, thereby saving the cost of the signaling.

Embodiment 2: The Number of Copies of the Duplicated PDCP PDU is Less than the Number of the RLC Entities for Transmitting the Duplicate Data The number of copies of the duplicated PDCP PDU is less than the number of the RLC entities for transmitting the duplicate data. Since the physical carriers corresponding to the logical channels of different RLC entities are different, the PDCP entity may dynamically select the first RLC entity in the RLC entities for transmitting the duplicate data, so that a better diversity effect may be obtained. In addition, if the number of copies of the duplicated PDCP PDU is 2, the consumption of resources at this time does not increase with the increase in the number of the RLC entity.

Optionally, the PDCP entity may determine the first RLC entity according to the indication information.

As an implementation manner, the PDCP entity determining the first RLC entity for transmitting the duplicated PDCP PDU according to the indication information may include the following. The PDCP entity determines the first RLC entity in the RLC entities for transmitting the duplicate data according to the indication information.

Optionally, the indication information may be used to indicate the PDCP entity to randomly select the first RLC entity in the RLC entities for transmitting the duplicate data. Alternatively, the indication information may be used to indicate the PDCP entity to determine the first RLC entity based on at least one of the number of retransmissions of data corresponding to the RLC entities for transmitting the duplicate data, the number of copies of the PDCP PDU transmitted by the RLC entities for transmitting the duplicate data, and the time for the RLC entities for transmitting the duplicate data to transmit the PDCP PDU.

In such case, as an example, the number of copies of the duplicated PDCP PDU may be equal to the number of the first RLC entity.

Referring to FIG. 5 again, RLC1, RLC2, and RLC3 may be used for transmission duplication. The first RLC entity comprises RLC1 and RLC2. The number of copies of the duplicated PDCP PDU is 2. The PDCP entity may deliver PDC PDU 1a to RLC1 and PDC PDU 1b to RLC2.

As another example, as shown in FIG. 10, PDCP PDU 1a and PDCP PDU 1b are the same PDCP PDU, PDCP PDU 2a and PDCP PDU 2b are the same PDCP PDU, PDCP PDU 3a and PDCP PDU 3b are the same PDCP PDU, and PDCP PDU 4a and PDCP PDU 4b are the same PDCP PDU. The RLC entities for transmitting the duplicate data are RLC1, RLC2, and RLC3, and RLC4 is not used to transmit the duplicate data. The PDCP entity may select to respectively deliver PDCP PDU 1a and PDCP PDU 1b to RLC1 and RLC2, PDCP PDU 2a and PDCP PDU 2b to RLC2 and RLC3, PDCP PDU 3a and PDCP PDU 3b to RLC1 and RLC3, and PDCP PDU 4a and PDCP PDU 4b to RLC1 and RLC2. That is, the RLC entity selected for the duplicate data of each PDCP PDU may be different.

As another example, as shown in FIG. 11, during the first period of time, the PDCP entity may deliver the duplicate data to RLC1 and RLC2. During the second period of time, the PDCP entity may deliver the duplicate data to RLC2 and RLC3. During the third period of time, the PDCP entity may deliver the duplicate data to RLC1 and RLC3.

Alternatively, after the PDCP entity transmits M duplicate data to RLC1 and RLC2, the PDCP entity switches to RLC2 and RLC3, and transmits the duplicate data to RLC2 and RLC3. After transmitting the M duplicate data to RLC2 and RLC3, the PDCP entity switches to RLC1 and RLC3, and transmits the duplicate data to RLC1 and RLC3.

As another example, the number of copies of the duplicated PDCP PDU may be greater than the number of the first RLC entity.

For example, the first RLC entity comprises RLC1 and RLC2. The number of copies of the duplicated PDCP PDU is 3, which are respectively PDC PDU 1a, PDC PDU 1b, and PDCP PDU 1c. The PDCP entity may deliver PDC PDU 1a to RLC1, and PDC PDU 1b and PDCP PDU 1c to RLC2.

It should be understood that the implementation manner of the PDCP entity determining the first RLC entity according to the indication information may be referred to the description regarding the PDCP entity determining the first RLC entity according to the indication information in Embodiment 1. For brevity of content, the description is not repeated here.

Embodiment 3: The Number of Copies of the Duplicated PDCP PDU is Greater than the Number of the RLC Entities for Transmitting the Duplicate Data In the embodiment, if the number of the RLC entities for transmitting the duplicate data is 2, at this time, additional RLC entity may not be added, so that the cost of the LCID is lower. In addition, since the number of copies of the duplicated PDCP PDU is increased, the reliability of duplicate data transmission may be improved.

In such case, the number of copies of the PDCP PDU may be greater than the number of the first RLC entity.

Referring to FIG. 6 again, RLC1 and RLC2 are the RLC entities transmitting the duplicate data (the PDCP entity does not deliver data to RLC3 and RLC4). The PDCP entity duplicates the PDCP PDU into 4 copies to be delivered to RLC1 and RLC2, where PDCP PDU 1a and PDCP PDU 1c are delivered to RLC1, and PDCP PDU 1b and PDCP PDU 1d are delivered to RLC2.

It should be understood that although Embodiment 1, Embodiment 2, and Embodiment 3 are respectively described above, it does not mean that Embodiment 1, Embodiment 2, and Embodiment 3 are independent. The description of each embodiment may be referred to each other, and the related description in Embodiment 1 may be applied to Embodiments 2 and 3 if there is no contradiction.

If the data sending end is the terminal device, in the embodiment of the disclosure, the method 300 may further include the following step. The PDCP entity receives a deactivation signaling. The deactivation signaling is used to deactivate the data duplication function of the PDCP entity.

The deactivation signaling may be the RRC signaling or the MAC CE.

It should be understood that the process of deactivation may be referred to the process of activation. Here, in order to avoid repetition, the detailed description is omitted.

For the CA-based duplicate data transmission, after the data duplication function of the PDCP entity is deactivated, the PDCP entity may transmit non-duplicate data to the master RLC entity.

For the DA-based duplicate data transmission, that is, all RLC entities associated with the PDCP entity do not belong to the same cell group (that is, do not correspond to the same MAC entity). If the sum of the number of copies of the duplicated PDCP PDU and the number of all RLC entities associated with the PDCP entity is less than the threshold, the PDCP entity may transmit the non-duplicate data to the master RLC entity.

If the sum of the number of copies of the duplicated PDCP PDU and the number of all RLC entities associated with the PDCP entity is greater than or equal to the threshold, the PDCP entity may determine the master RLC entity and/or the secondary RLC entity transmitting the non-duplicate data.

As an example, the deactivation signaling may include the RLC entity transmitting the non-duplicate data after deactivation.

Referring to FIG. 8 again, for example, for the CA-based data duplication and transmission, the MAC CE shown in FIG. 8 may implement the above functions. For example, D/A set to 0 represents deactivation, DRB identity represents that the corresponding DRB ID needs to be deactivated, and one bit in the bitmap represents that one associated RLC is used to transmit the non-duplicate data. For the DC-based data duplication and transmission, the MCG MAC entity and the SCG MAC entity respectively correspond to the master RLC entity and the secondary RLC entity, so two bits need to be set to 1. A correspondence may be adopted. For example, the first four bits correspond to the RLC entity belonging to the MCG MAC entity, and the last four bits correspond to the RLC entity belonging to the SCG MAC entity. The correspondence between the bitmap and the RLC entity may be mapped to the bitmap in ascending/descending order of the logical channel ID of the RLC.

For example, the MCG corresponds to two RLC entities, the LCIDs of the two RLC entities are 3 and 6, and the SCG corresponds to two RLC entities, and the LCIDs of the two RLC entities are also 3 and 6 (the LCIDs of the RLC corresponding to the MCG and the SCG are independently numbered). The correspondence may be that the RLC entities corresponding to the MCG with the LCIDs of 3 and 6 correspond to the first four bits of the bitmap, and the RLC entities corresponding to the SCG with the LCIDs of 3 and 6 correspond to the last four bits of the bitmap. The correspondence between the bitmap and the RLC entities may be according to ascending order of the LCID.

As another example, if the deactivation signaling is the MAC CE, the PDCP entity may also receive the RRC signaling. The RRC signaling is used to indicate the master RLC and/or the secondary RLC after deactivation.

In such case, the MAC CE deactivation signaling may adopt the MAC CE format in the prior art, that is, only the deactivation of the duplicate data transmission of the DRB is indicated. The RRC signaling configures a specific master RLC and/or secondary RLC entity. After the duplicate data transmission of the DRB is deactivated, the PDCP entity adopts the configured master RLC and/or secondary RLC entity for the DRB to transmit the non-duplicate data.

For the DC-based duplicate data transmission, and the PDCP entity is associated with more than 2 RLC entities, an implementation manner of the RRC signaling indication is that a field may be added in the RRC signaling to indicate how to transmit the non-duplicate data by the RLC entity corresponding to the SCG after deactivation.

Another implementation manner of the RRC signaling indication is that an indication field is added in the RRC signaling to indicate the master RLC entity or the secondary RLC entity.

Optionally, the method 300 may further include the following step. If all carriers of the first RLC entity are deactivated, the PDCP entity may determine a third RLC entity transmitting the duplicated PDCP PDU. The third RLC entity is different from the first RLC entity.

That is to say, when a certain carrier or a certain group of carriers is deactivated, the PDCP entity may judge whether the carrier associated with the logical channel of the first RLC entity has been deactivated. If all the carriers are deactivated, the PDCP entity may select another RLC entity to transmit the duplicated PDCP PDU.

After the data receiving end receives the PDCP PDUs, the PDCP entity at the data receiving end may detect whether the received PDCP PDUs are the same duplicate data. If yes, one of the PDCP PDU is discarded, and the other is then delivered to a higher layer.

Optionally, the PDCP entity at the data receiving end may judge whether the received PDCP PDUs are the same duplicate data according to the SNs of the received PDCP PDUs. If the SNs are the same, the PDCP PDUs are the same duplicate data.

It should be understood that the same PDCP PDUs may not arrive at the PDCP layer of the data receiving end at the same time.

FIG. 12 is a schematic flowchart of another data transmission method according to an embodiment of the disclosure. A method 1200 may be executed by a data sending end. The data sending end may be a communication device. For example, the method 1200 may be executed by a network device or a terminal device.

Optionally, when the method 1200 is used for uplink transmission, the data sending end is the terminal device and the data receiving end is the network device.

Optionally, when the method 1200 is used for downlink transmission, the data sending end is the network device and the data receiving end is the terminal device.

Of course, the method 1200 may also be used for D2D transmission or V2V transmission.

The method 1200 may include at least some of the following content.

In 1200, a PDCP entity transmits a second number of duplicated PDCP PDU to a first number of first RLC entity.

The first number is less than the second number.

Optionally, in the embodiment of the disclosure, if a second RLC entity in the first RLC entity receives multiple PDCP PDUs in the PDCP PDU, the PDCP entity transmits the second number of the duplicated PDCP PDU to the first number of the first RLC entity, which comprises the following step.

The PDCP entity transmits the PDCP PDUs to the second RLC entity based on at least one of the transmission time of the PDCP PDU, the number of data packets, and the size of the data packet.

Optionally, in the embodiment of the disclosure, the PDCP PDUs satisfy at least one of the following conditions: the transmission time between every two PDCP PDUs in the PDCP PDUs is greater than or equal to a predetermined time; the number of data packets between every two PDCP PDUs in the PDCP PDUs is greater than or equal to a predetermined number; and the size of the data packet between every two PDCP PDUs in the PDCP PDUs is greater than or equal to a predetermined size.

Optionally, in the embodiment of the disclosure, the method 1200 further comprises the following step. The PDCP entity sends first information to the second RLC entity. The first information is used to indicate that the PDCP PDUs are the same PDCP PDU.

Optionally, in the embodiment of the disclosure, the number of copies of the PDCP PDU transmitted by the PDCP entity to each RLC entity in the first RLC entity is configured in the PDCP entity.

Optionally, in the embodiment of the disclosure, the method 1200 further comprises: the PDCP entity receives second information, and the second information is used to indicate the number of copies of the PDCP PDU transmitted by the PDCP entity to each RLC entity in the first RLC entity.

Optionally, in the embodiment of the disclosure, the number of copies of the PDCP PDU transmitted by the PDCP entity to each RLC entity in the first RLC entity is the same.

Optionally, in the embodiment of the disclosure, the method 1200 further comprises the following step. The PDCP entity receives configuration information. The configuration information is used to indicate the second number.

Optionally, in the embodiment of the disclosure, the second number is configured in the PDCP entity.

Optionally, in the embodiment of the disclosure, the method 1200 further comprises the following step. The PDCP entity determines the first RLC entity according to the indication information.

Optionally, in the embodiment of the disclosure, the indication information is configured in the PDCP entity or the indication information is sent to the PDCP entity by the network device.

It should be understood that the implementation of method 1200 may be referred to the implementation manner of the method 300. For brevity of content, the details are not repeated here.

In the embodiment of the disclosure, after determining the number of copies of the duplicated PDCP PDU, the PDCP entity may determine the first RLC entity transmitting the PDCP PDU according to the indication information, and then transmit the determined PDCP PDU to the first RLC entity, thereby implementing data duplication and transmission at a PDCP layer.

It should be noted that under the premise of no conflict, the embodiments and/or the technical features in the embodiments described in the disclosure may be arbitrarily combined. The technical solution obtained after the combination should also fall within the protection scope of the disclosure.

It should be understood that in the embodiments of the disclosure, the size of serial numbers of the above processes does not refer to the order of execution sequence. The execution sequence of the processes should be determined by the functions and internal logics thereof, and should not constitute any limitation to the implementation processes of the embodiments of the disclosure.

The data transmission method according to the embodiments of the disclosure is described in detail above. The communication device according to the embodiments of the disclosure will be described below in conjunction with FIG. 13 to FIG. 15. The technical features described in the method embodiment are applicable to the following embodiments of the device.

Figure 13:
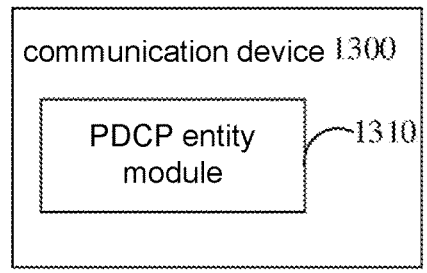
FIG. 13 is a schematic block diagram of a communication device according to an embodiment of the disclosure.

FIG. 13 shows a schematic block diagram of a communication terminal device 1300 according to an embodiment of the disclosure. As shown in FIG. 13, the communication device 1300 comprises the following.

A PDCP entity module 1310 is used to determine the number of copies of duplicated PDCP PDU.

The PDCP entity module 1310 is further used to determine a first RLC entity module transmitting the PDCP PDU according to indication information.

The PDCP entity module 1310 is further used to transmit the PDCP PDU to the first RLC entity module.

Optionally, in the embodiment of the disclosure, the indication information is configured in the PDCP entity module 1310 or the indication information is sent to the PDCP entity module 1310 by a network device.

Optionally, in the embodiment of the disclosure, the PDCP entity module 1310 is specifically used to receive configuration information. The configuration information is used to indicate the number of copies of the PDCP PDU.

Optionally, in the embodiment of the disclosure, the number of copies of the PDCP PDU is configured in the PDCP entity module 1310.

Optionally, in the embodiment of the disclosure, the first RLC entity module belongs to some or all RLC entity modules for transmitting duplicate data.

Optionally, in the embodiment of the disclosure, the number of copies of the PDCP PDU is equal to the number of the RLC entity module for transmitting the duplicate data.

Optionally, in the embodiment of the disclosure, the number of copies of the PDCP PDU is less than the number of the RLC entity module for transmitting the duplicate data.

Optionally, in the embodiment of the disclosure, the number of copies of the PDCP PDU is greater than the number of the RLC entity module for transmitting the duplicate data.

Optionally, in the embodiment of the disclosure, the PDCP entity module 1310 is specifically used to determine the first RLC entity module in the RLC entity modules for transmitting the duplicate data according to the indication information.

Optionally, in the embodiment of the disclosure, the indication information is used to indicate the PDCP entity module 1310 to randomly select the first RLC entity module in the RLC entity modules for transmitting the duplicate data.

Optionally, in the embodiment of the disclosure, the indication information is used to indicate the PDCP entity module 1310 to determine the first RLC entity module based on at least one of the number of retransmissions of data corresponding to the RLC entity module for transmitting the duplicate data, the number of copies of the PDCP PDU transmitted by the RLC entity module for transmitting the duplicate data, and the time for the RLC entity module for transmitting the duplicate data to transmit the PDCP PDU.

Optionally, in the embodiment of the disclosure, the PDCP entity module 1310 is further used to receive an activation signaling. The activation signaling is used to activate the data duplication function of the PDCP entity module 1310.

Optionally, in the embodiment of the disclosure, the activation signaling is a first RRC signaling or the MAC CE.

Optionally, in the embodiment of the disclosure, the activation signaling comprises the RLC entity module for transmitting the duplicate data.

Optionally, in the embodiment of the disclosure, if the activation signaling is the MAC CE, the PDCP entity module 1310 is further used to receive a second RRC signaling. The second RRC signaling comprises the RLC entity module for transmitting the duplicate data.

Optionally, in the embodiment of the disclosure, the number of copies of the PDCP PDU is equal to the number of the first RLC entity module.

Optionally, in the embodiment of the disclosure, the number of copies of the PDCP PDU is greater than the number of the first RLC entity module.

Optionally, in the embodiment of the disclosure, if a second RLC entity module in the first RLC entity module receives multiple PDCP PDUs in the PDCP PDU, the PDCP entity module 1310 is specifically used to transmit the PDCP PDUs to the second RLC entity module based on at least one of the transmission time of the PDCP PDU, the number of data packets, and the size of the data packet.

Optionally, in the embodiment of the disclosure, the PDCP PDUs satisfy at least one of the following conditions: the transmission time between every two PDCP PDUs in the PDCP PDUs is greater than or equal to a predetermined time; the number of data packets between every two PDCP PDUs in the PDCP PDUs is greater than or equal to a predetermined number; and the size of the data packet between every two PDCP PDUs in the PDCP PDUs is greater than or equal to a predetermined size.

Optionally, in the embodiment of the disclosure, the PDCP entity module 1310 is further used to send first information to the second RLC entity module. The first information is used to indicate that the PDCP PDUs are the same PDCP PDU.

Optionally, in the embodiment of the disclosure, the number of copies of the PDCP PDU transmitted by the PDCP entity module 1310 to each RLC entity module in the first RLC entity module is configured in the PDCP entity module 1310.

Optionally, in the embodiment of the disclosure, the PDCP entity module 1310 is further used to receive second information. The second information is used to indicate the number of copies of the PDCP PDU transmitted by the PDCP entity module 1310 to send each RLC entity module in the first RLC entity module.

Optionally, in the embodiment of the disclosure, the PDCP entity module 1310 transmits the same number of copies of the PDCP PDU to each RLC entity module in the first RLC entity module.

Optionally, in the embodiment of the disclosure, the PDCP entity module 1310 is further used to receive a deactivation signaling. The deactivation signaling is used to deactivate the data duplication function of the PDCP entity module 1310.

Optionally, in the embodiment of the disclosure, the deactivation signaling is the RRC signaling or the MAC CE.

Optionally, in the embodiment of the disclosure, the deactivation signaling comprises an RLC entity module transmitting non-duplicate data after deactivation.

Optionally, in the embodiment of the disclosure, the PDCP entity module 1310 is further used to receive a third RRC signaling. The third RRC signaling comprises the RLC entity module transmitting non-duplicate data after deactivation.

Optionally, in the embodiment of the disclosure, MAC entity modules corresponding to the RLC entity modules associated with the PDCP entity module 1310 are different, and the sum of the number of copies of the PDCP PDU and the RLC entity modules associated with the PDCP entity module 1310 is greater than or equal to a threshold.

Optionally, in the embodiment of the disclosure, the PDCP entity module 1310 is further used to determine a third RLC entity module transmitting the PDCP PDU if all carriers of the first RLC entity module are deactivated. The third RLC entity module is different from the first RLC entity module.

Optionally, in the embodiment of the disclosure, the number of copies of the PDCP PDU is greater than 2.

Optionally, in the embodiment of the disclosure, the number of the RLC entity modules associated with the PDCP entity module 1310 is greater than 2.

It should be understood that the communication device 1300 may correspond to the communication device in the method 300 and may implement the corresponding operations of the communication device in the method 300. For brevity of content, the details are not repeated here.

Figure 14:
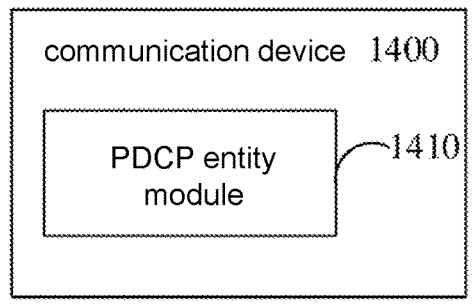
FIG. 14 is a schematic block diagram of a communication device according to an embodiment of the disclosure.

FIG. 14 shows a schematic block diagram of a communication device 1400 according to an embodiment of the disclosure. As shown in FIG. 14, the communication device 1400 comprises the following.

A PDCP entity module 1410 is used to transmit a second number of duplicated PDCP PDU to a first number of first RLC entity module. The first number is less than the second number.

Optionally, in the embodiment of the disclosure, if a second RLC entity module in the first RLC entity module receives multiple PDCP PDUs in the PDCP PDU, the PDCP entity module 1410 is specifically used to transmit the PDCP PDUs to the second RLC entity module based on at least one of the transmission time of the PDCP PDU, the number of data packets, and the size of the data packet.

Optionally, in the embodiment of the disclosure, the PDCP PDUs satisfy at least one of the following conditions: the transmission time between every two PDCP PDUs in the PDCP PDUs is greater than or equal to a predetermined time; the number of data packets between every two PDCP PDUs in the PDCP PDUs is greater than or equal to a predetermined number; and the size of the data packet between every two PDCP PDUs in the PDCP PDUs is greater than or equal to a predetermined size.

Optionally, in the embodiment of the disclosure, the PDCP entity module 1410 is further used to send first information to the second RLC entity module. The first information is used to indicate that the PDCP PDUs are the same PDCP PDU.

Optionally, in the embodiment of the disclosure, the number of copies of the PDCP PDU transmitted by the PDCP entity module 1410 to each RLC entity module in the first RLC entity module is configured in the PDCP entity 1410.

Optionally, in the embodiment of the disclosure, the PDCP entity module 1410 is further used to receive second information. The second information is used to indicate the number of copies of the PDCP PDU transmitted by the PDCP entity module 1410 to send each RLC entity module in the first RLC entity module.

Optionally, in the embodiment of the disclosure, the PDCP entity module 1410 transmits the same number of copies of the PDCP PDU to each RLC entity module in the first RLC entity module.

Optionally, in the embodiment of the disclosure, the PDCP entity module 1410 is further used to receive configuration information. The configuration information is used to indicate the second number.

Optionally, in the embodiment of the disclosure, the PDCP entity 1410 is configured with the second number.

Optionally, in the embodiment of the disclosure, the PDCP entity module 1410 is further used to determine the first RLC entity module according to indication information.

Optionally, in the embodiment of the disclosure, the indication information is configured in the PDCP entity 1410 or the indication information is sent to the PDCP entity module 1410 by a network device.

It should be understood that the communication device 1400 may correspond to the communication device in the method 1200 and may implement the corresponding operations of the communication device in the method 1200. For brevity of content, the details are not repeated here.

Figure 15:
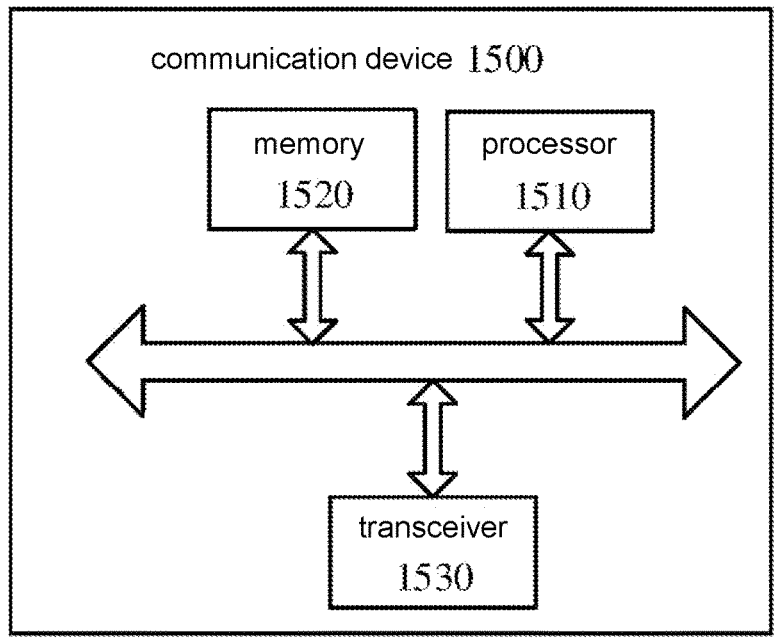
FIG. 15 is a schematic block diagram of a communication device according to an embodiment of the disclosure.

FIG. 15 is a schematic block diagram of a communication device 1500 according to an embodiment of the disclosure. The communication device 1500 shown in FIG. 15 comprises a processor 1510. The processor 1510 may call and run a computer program from a memory 1520 to implement the method in the embodiment of the disclosure.

Optionally, as shown in FIG. 15, the communication device 1500 may further include the memory 1520. The processor 1510 may call and run a computer program from the memory 1520 to implement the method in the embodiment of the disclosure.

The memory 1520 may be a separate device independent of the processor 1510 or may be integrated in the processor 1510.

Optionally, as shown in FIG. 15, the communication device 1500 may further include a transceiver 1530. The processor 1510 may control the transceiver 1530 to communicate with other devices. Specifically, the transceiver 1530 may send information or data to other devices or receive information or data sent by other devices.

The transceiver 1530 may include a transmitter and a receiver. The transceiver 1530 may further include an antenna. The number of the antenna may be one or more.

Optionally, the communication device 1500 may specifically be the communication device of the embodiment of the disclosure, and the communication device 1500 may implement the corresponding process implemented by the communication device in each method of the embodiment of the disclosure. For brevity of content, the details are not repeated here.

Figure 16:
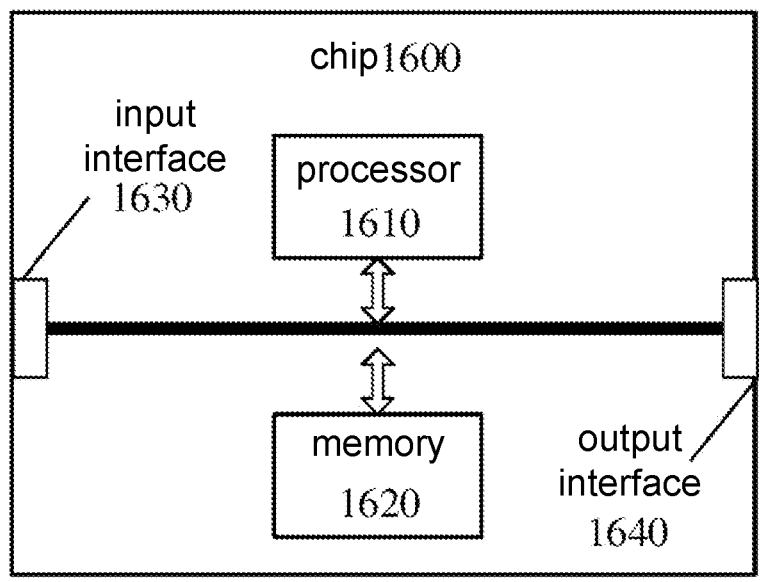
FIG. 16 is a schematic block diagram of a chip according to an embodiment of the disclosure.

FIG. 16 is a schematic block diagram of a chip according to an embodiment of the disclosure. A chip 1600 shown in FIG. 16 comprises a processor 1610. The processor 1610 can call and run a computer program from a memory to implement the method in the embodiment of the disclosure.

Optionally, as shown in FIG. 16, the chip 1600 may further include a memory 1620. The processor 1610 may call and run a computer program from the memory 1620 to implement the method in the embodiment of the disclosure.

The memory 1620 may be a separate device independent of the processor 1610 or may be integrated in the processor 1610.

Optionally, the chip 1600 may further include an input interface 1630. The processor 1610 may control the input interface 1630 to communicate with other devices or chips. Specifically, the input interface 1630 may obtain information or data sent by other devices or chips.

Optionally, the chip 1600 may further include an output interface 1640. The processor 1610 may control the output interface 1640 to communicate with other devices or chips. Specifically, the output interface 1640 may output information or data to other devices or chips.

Optionally, the chip may be applied to the communication device in the embodiment of the disclosure, and the chip may implement the corresponding process implemented by the communication device in each method of the embodiment of the disclosure. For brevity of content, the details are not repeated here.

It should be understood that the chip mentioned in the embodiment of the disclosure may also be referred to as a system-level chip, a system chip, a chip system, a system-on-chip, etc.

It should be understood that the processor in the embodiment of the disclosure may be an integrated circuit chip, which has signal processing capabilities. During the implementation process, the steps of the method embodiment may be completed through a hardware integrated logic circuit in the processor or indications in the form of software. The processor may be a general-purpose processor, a digital signal processor (DSP), an application specific integrated circuit (ASIC), a field programmable gate array (FPGA), or other programmable logic devices, discrete gate or transistor logic devices, or discrete hardware components that may implement or execute the methods, steps, and logical block diagrams disclosed in the embodiments of the disclosure. The general processor may be a microprocessor or any conventional processor, etc. The steps of the method disclosed in the embodiments of the disclosure may be directly embodied as being executed and completed by a hardware decoding processor or executed and completed by a combination of hardware and software modules in the decoding processor. The software module may be located in a random access memory, a flash memory, a read-only memory, a programmable read-only memory, an electrically erasable programmable memory, a register, and other mature storage media in the field. The storage medium is located in the memory. The processor reads information in the memory and completes the steps of the method in conjunction with the hardware thereof.

It can be understood that the memory in the embodiments of the disclosure may be a volatile memory or a non-volatile memory, or may include both volatile and non-volatile memories. The non-volatile memory may be a read-only memory (ROM), a programmable ROM (PROM), an erasable PROM (EPROM), an electrically EPROM (EEPROM), or a flash memory. The volatile memory may be a random access memory (RAM), which is used as an external cache. Through exemplary but not restrictive description, many forms of RAMs are available, such as a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DR RAM). It should be noted that the memory of the system and the method described herein is intended to include but not limited to these and any other suitable types of memories.

It should be understood that the memory described above is exemplary but not restrictive. For example, the memory in the embodiments of the disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), etc. That is to say, the memory in the embodiments of the disclosure is intended to include but not limited to these and any other suitable types of memories.

Figure 17:
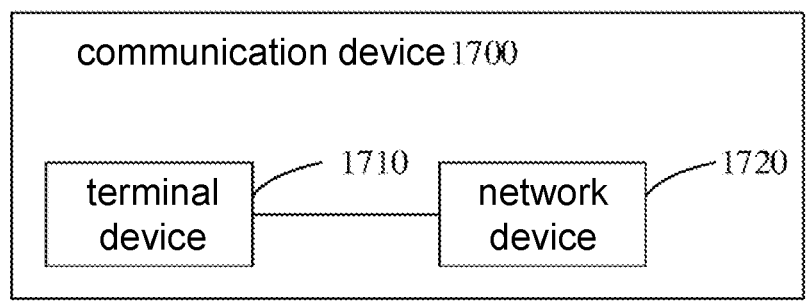
FIG. 17 is a schematic block diagram of a communication system according to an embodiment of the disclosure.

FIG. 17 is a schematic block diagram of a communication system 1700 according to an embodiment of the disclosure. As shown in FIG. 17, the communication system 1700 comprises a terminal device 1710 and a network device 1720.

For uplink transmission, the terminal device 1710 may be used to implement the corresponding functions implemented by the data sending end in the above method, and the network device 1720 may be used to implement the corresponding functions implemented by the data receiving end in the above method. For brevity of content, the details are not repeated here.

For downlink transmission, the terminal device 1710 may be used to implement the corresponding functions implemented by the data receiving end in the above method, and the network device 1720 may be used to implement the corresponding functions implemented by the data sending end in the above method. For brevity of content, the details are not repeated here.

The embodiment of the disclosure also provides a computer-readable storage medium for storing a computer program.

Optionally, the computer-readable storage medium may be applied to a terminal device in the embodiment of the disclosure, and the computer program enables a computer to execute the corresponding process implemented by the terminal device in each method of the embodiment of the disclosure. For brevity of content, the details are not repeated here.

Optionally, the computer-readable storage medium may be applied to a network device in the embodiment of the disclosure, and the computer program enables the computer to execute the corresponding process implemented by the network device in each method of the embodiment of the disclosure. For brevity of content, the details are not repeated here.

The embodiment of the disclosure also provides a computer program product, which comprises a computer program command.

Optionally, the computer program product may be applied to a terminal device in the embodiment of the disclosure, and the computer program command enables a computer to execute the corresponding process implemented by the terminal device in each method of the embodiment of the disclosure. For brevity of content, the details are not repeated here.

Optionally, the computer program product may be applied to a network device in the embodiment of the disclosure, and the computer program command enables the computer to execute the corresponding process implemented by the network device in each method of the embodiment of the disclosure. For brevity of content, the details are not repeated here.

The embodiment of the disclosure also provides a computer program.

Optionally, the computer program may be applied to a terminal device in the embodiment of the disclosure. When the computer program is run on a computer, the computer is enabled to execute the corresponding process implemented by the terminal device in each method of the embodiment of the disclosure. For brevity of content, the details are not repeated here.

Optionally, the computer program may be applied to a network device in the embodiment of the disclosure. When the computer program is run on the computer, the computer is enabled to execute the corresponding process implemented by the network device in each method of the embodiment of the disclosure. For brevity of content, the details are not repeated here.

Persons skilled in the art may be aware that exemplary units and algorithm steps described in the embodiments disclosed herein can be implemented by electronic hardware or a combination of computer software and electronic hardware. Whether the functions are executed by hardware or software depends on the specific applications and design constraint conditions of the technical solution. Persons skilled in the art may implement the described functions using different methods for each specific application, but such implementation should not be deemed as exceeding the scope of the disclosure.

Persons skilled in the art may clearly understand that for the convenience and brevity of description, the specific working processes of the system, the device, and the unit described above may be referred to the corresponding process in the method embodiment, which are not repeated here.

In the several embodiments provided in the disclosure, it should be understood that the disclosed system, device, and method may be implemented in other ways. For example, the device embodiment described above is only illustrative. For example, the division of units is only a logical function division, and there may be other manners of division in actual implementation. For example, multiple units or components may be combined or integrated into another system, or some features may be ignored or not implemented. In addition, the displayed or discussed mutual coupling, direct coupling, or communication connection may be indirect coupling or communication connection through some interfaces, devices, or units, or may be electrical, mechanical, or other forms.

The units described as separate parts may or may not be physically separated, and the parts displayed as units may or may not be physical units, that is, may be located in one place or distributed on multiple network units. Some or all of the units may be selected according to actual requirements to implement the objectives of the solution of the embodiments.

In addition, the functional units in the embodiments of the disclosure may be integrated into one processing unit, each unit may physically exist alone, or two or more units may be integrated into one unit.

If the function is implemented in the form of a software functional unit and sold or used as an independent product, the function may be stored in a computer-readable storage medium. Based on such understanding, the technical solution of the disclosure essentially, a part that contributes to the existing technology, or a part of the technical solution may be embodied in the form of a software product. The computer software product is stored in a storage medium and comprises several commands for a computer device (which may be a personal computer, a server, a network device, etc.) to execute all or part of the steps of the method described in each embodiment of the disclosure. The storage medium comprises a U disk, a mobile hard disk, a read-only memory (ROM), a random access memory (RAM), a disk, a compact disk, or other media that may store program codes.

The above are only specific implementations of the disclosure, but the protection scope of the disclosure is not limited thereto. Changes or substitutions easily conceived by persons skilled in the art within the technical scope disclosed in the disclosure should all be included in the protection scope of the disclosure. Therefore, the protection scope of the disclosure shall be defined by the protection scope of the claims.

What is claimed is:

1. A data transmission method, adapted to a terminal device, comprising:
   determining a plurality of first radio link layer control protocol (RLC) entities used for transmitting a duplicated packet data convergence protocol (PDCP) protocol data unit (PDU); and
   transmitting the duplicated PDCP PDU to the first RLC entities, wherein the first RLC entities belong to all RLC entities used for transmitting duplicate data, and a PDCP layer corresponding to a PDCP entity is associated with M RLC entities; and
   receiving an activation signaling, wherein the activation signaling comprises a bitmap comprising a plurality of bits, each bit in the bitmap corresponds to one RLC entity of the M RLC entities, and each bit is used to indicate a duplicate data transmission function of the corresponding one RLC entity;
   wherein each of the RLC entities is associated with a corresponding logical channel;
   the one RLC entity corresponds to the bits in the bitmap based on an ascending order of an identity of the corresponding logical channel, wherein the PDCP entity is one-to-one corresponding to a data resource bearer (DRB), and 5 bits of a byte of the activation signaling are used to indicate an identity of the DRB, wherein the activation signaling is a medium access control (MAC) control element (CE), wherein a length of the MAC CE is a byte.

2. The method according to claim 1, wherein the step of determining the first RLC entities used for transmitting the duplicated PDCP PDU comprises:
   determining, from the M RLC entities, an RLC entity used for transmitting the duplicate data.

3. The method according to claim 2, wherein M is determined to be 4.

4. The method according to claim 3, further comprising:
   determining a number of copies of the duplicated PDCP PDU, wherein a number of the RLC entities used for transmitting the duplicate data is equal to the number of the copies.

5. The method according to claim 4, wherein the number of the copies is integer larger than 2.

6. The method according to claim 4, wherein the number of the copies is 3, and the number of the RLC entities used for transmitting the duplicate data is 3.

7. The method according to claim 4, wherein the number of the copies is 4, and the number of the RLC entities used for transmitting the duplicate data is 4.

8. The method according to claim 2, wherein the activation signaling is used to indicate the RLC entities used for transmitting the duplicate data and, or used to activate a data duplication function of the PDCP entity.

9. A terminal device, comprising:
   a processor and a memory, wherein the memory is used to store a computer program, and the processor is used to call and run the computer program stored in the memory to perform:
   determining a plurality of first radio link layer control protocol (RLC) entities used for transmitting a duplicated packet data convergence protocol (PDCP) protocol data unit (PDU); and
   transmitting the duplicated PDCP PDU to the first RLC entities, wherein the first RLC entities belong to all RLC entities used for transmitting duplicate data, and a PDCP layer corresponding to a PDCP entity is associated with M RLC entities; and
   receiving an activation signaling, wherein the activation signaling comprises a bitmap comprising a plurality of bits, each bit in the bitmap corresponds to one RLC entity of the M RLC entities, and each bit is used to indicate a duplicate data transmission function of the corresponding one RLC entity;
   wherein each of the RLC entities is associated with a corresponding logical channel;
   the one RLC entity corresponds to the bits in the bitmap based on an ascending order of an identity of the corresponding logical channel, wherein the PDCP entity is one-to-one corresponding to a data resource bearer (DRB), and 5 bits of a byte of the activation signaling are used to indicate an identity of the DRB, wherein the activation signaling is a medium access control (MAC) control element (CE, wherein a length of the MAC CE is a byte.

10. The terminal device according to claim 9, wherein the step of determining the first RLC entities used for transmitting the duplicated PDCP PDU comprises determining, from the M RLC entities, an RLC entity used for transmitting the duplicate data, wherein M is determined to be 4;
    wherein the processor further performs:
    determining a number of copies of the duplicated PDCP PDU, wherein a number of the RLC entities used for transmitting the duplicate data is equal to the number of the copies.

11. The terminal device according to claim 9, wherein the activation signaling is used to indicate the RLC entities used for transmitting the duplicate data and, or used to activate a data duplication function of the PDCP entity.

12. A non-transitory computer-readable storage medium, used to store a computer program that enables a computer to execute:
  determining a plurality of first radio link layer control protocol (RLC) entities used for transmitting a duplicated packet data convergence protocol (PDCP) protocol data unit (PDU); and
  transmitting the duplicated PDCP PDU to the first RLC entities, wherein the first RLC entities belong to all RLC entities used for transmitting duplicate data, and a PDCP layer corresponding to a PDCP entity is associated with M RLC entities; and
  receiving an activation signaling, wherein the activation signaling comprises a bitmap comprising a plurality of bits, each bit in the bitmap corresponds to one RLC entity of the M RLC entities, and each bit is used to indicate a duplicate data transmission function of the corresponding one RLC entity;
  wherein each of the RLC entities is associated with a corresponding logical channel;
  the one RLC entity corresponds to the bits in the bitmap based on an ascending order of an identity of the corresponding logical channel, wherein the PDCP entity is one-to-one corresponding to a data resource bearer (DRB), and 5 bits of a byte of the activation signaling are used to indicate an identity of the DRB, wherein the activation signaling is a medium access control (MAC) control element (CE), wherein a length of the MAC CE is a byte.

* * * * *